Aug. 14, 1951  L. N. SMITH ET AL  2,564,586
LAWN MOWER
Filed Feb. 5, 1948  2 Sheets-Sheet 1
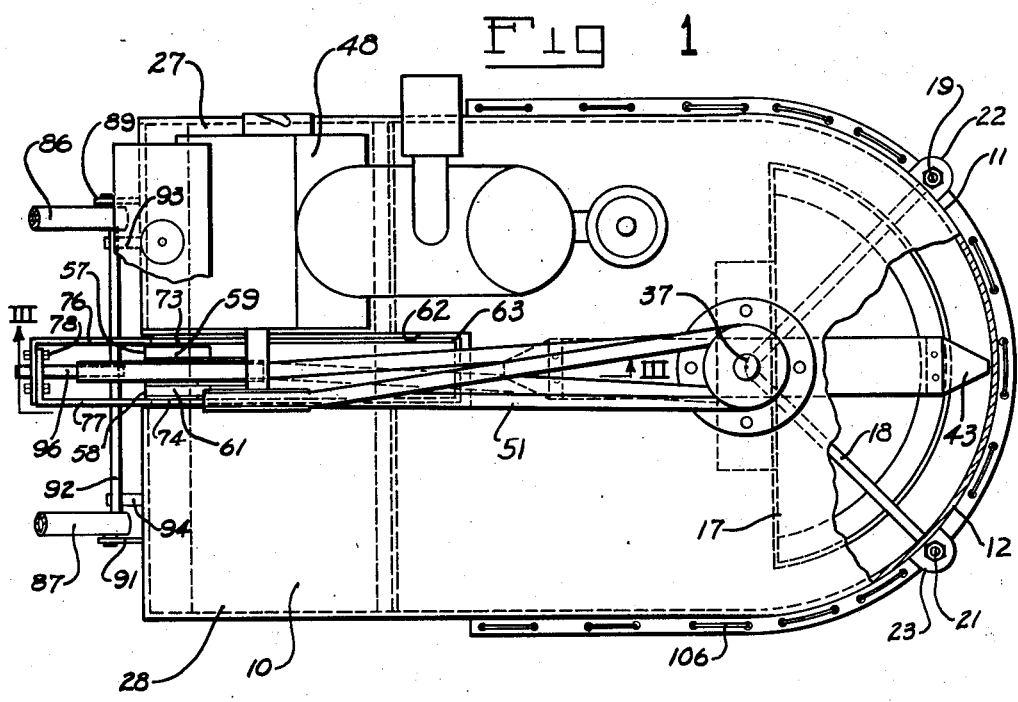
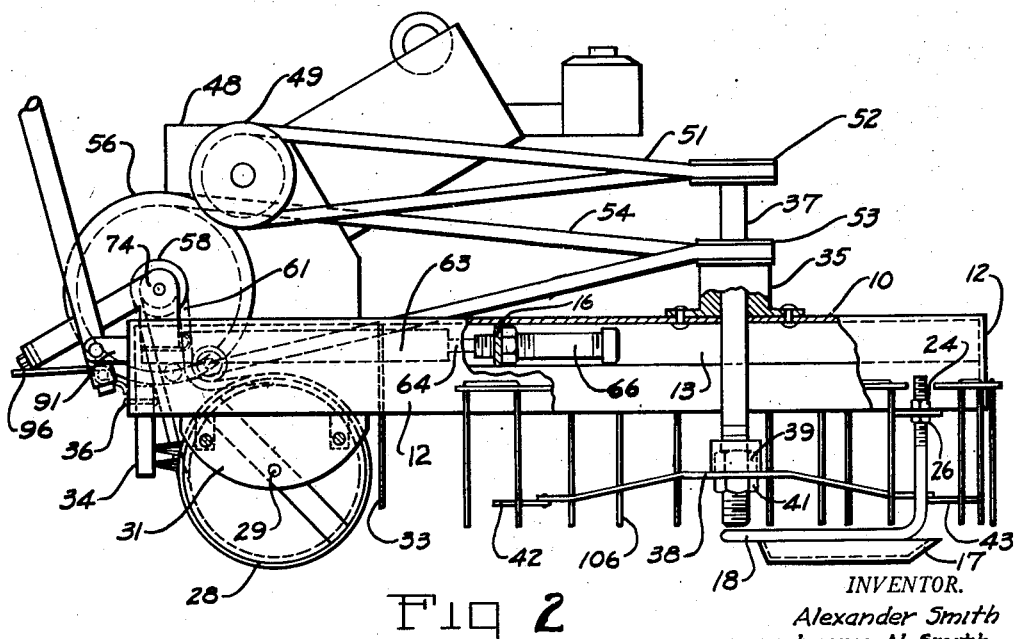
INVENTOR.
Alexander Smith
Lucius N. Smith
BY
Attorney Aug. 14, 1951 — L. N. SMITH ET AL — 2,564,586
LAWN MOWER
Filed Feb. 5, 1948 — 2 Sheets-Sheet 2
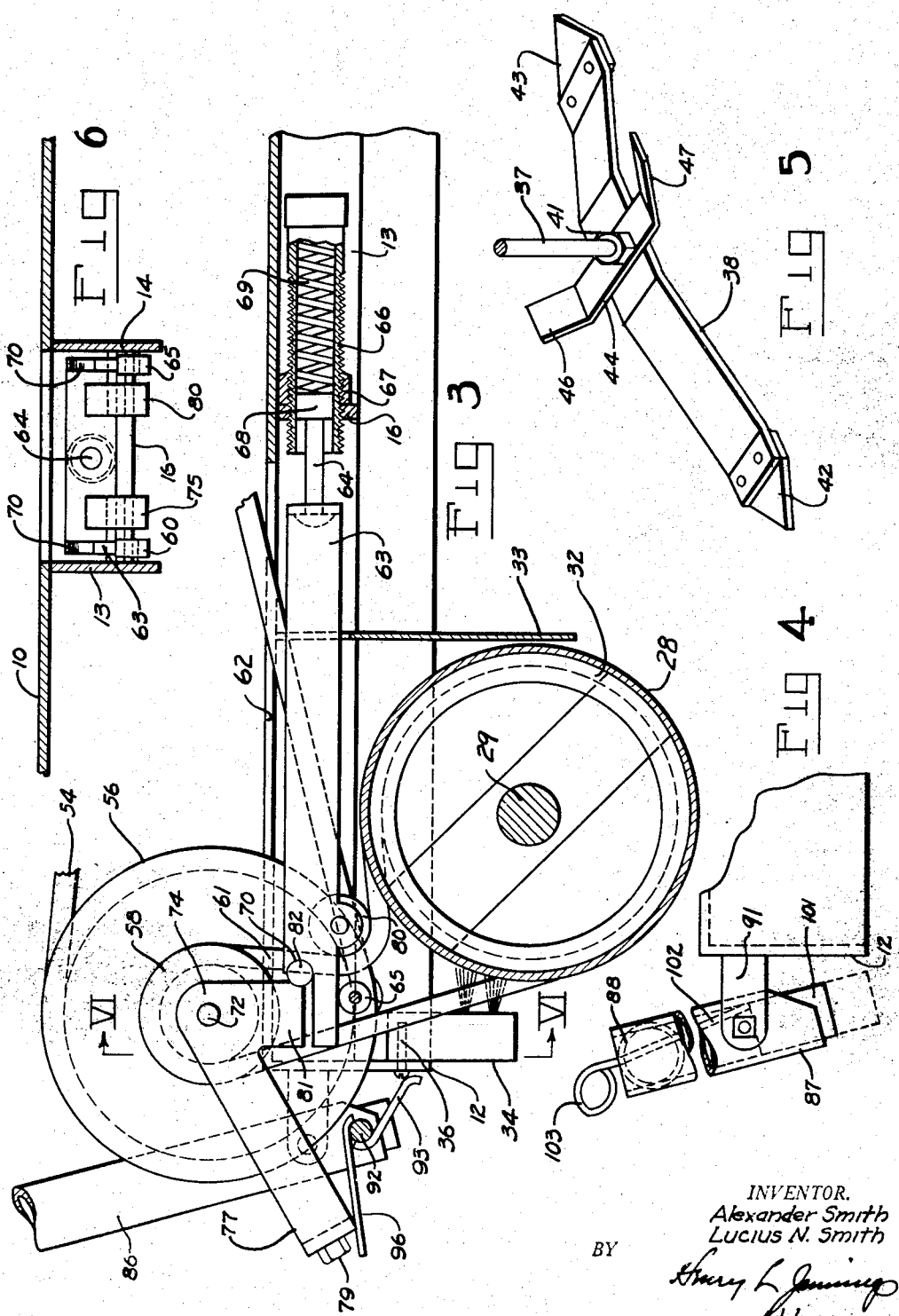
INVENTOR.
Alexander Smith
Lucius N. Smith
BY
Harry L. Jennings
Attorney Patented Aug. 14, 1951

2,564,586

UNITED STATES PATENT OFFICE 2,564,586

LAWN MOWER

Lucius N. Smith and Alexander Smith, Monteverde, Fla.

Application February 5, 1948, Serial No. 6,364

6 Claims. (Cl. 56—25.4)

This invention relates to lawn mowers and has for an object the provision of a motor driven mower which shall embody a horizontal cutting bar with means to maintain the cutting bar at a uniform, predetermined distance above the ground.

A further object of our invention is to provide a lawn mower embodying a horizontal cutting bar which shall include supporting and propelling means so disposed as to adapt the mower to move over uneven ground cutting the grass at a uniform height.

A still further object of our invention is to provide a lawn mower with supporting and propelling means so disposed as to smooth and roll a lawn as it is being mowed, and with a minimum of damage to the lawn in turning.

Another object of our invention is to provide a motor driven lawn mower embodying cutting and propelling means and including a clutch operable to disconnect the propelling means by the weight of the lawn mower handle.

Another object of our invention is to provide a motor driven lawn mower embodying a horizontal cutting bar together with a breaker bar so situated as to break long grass and throw it outward in the path of the cutter bar.

Briefly, the principal features of our invention comprise a lawn mower having an elongated body with a cover therefor, a roller support at the rear of the body, and a flat sliding support at the forward end of the body, with a horizontal cutter bar mounted to rotate above the flat sliding support. The sliding support is made in the form of a pan with a forward upturned edge whereby it maintains the cutter bar at a uniform distance above the ground being mowed and thus adapts the mower for use on uneven ground and providing a uniform cut of the grass over such ground. The sliding pan support under the front of the mower also aids in pushing loose dirt and grass into low places on the lawn where they are rolled down by the roller support at the rear of the body. The motor for driving the mower is mounted over the roller support thereby to provide the necessary weight over the roller to smooth the lawn.

Another feature of our invention is the provision of a breaker bar so positioned with respect to the horizontal as to knock down any tall grass being mowed and preventing it from wrapping around the cutter bar drive shaft.

Still another feature is the provision of a novel form of clutch which operates from the handle of the mower to disconnect the drive therefrom when the handle is turned loose by the operator, together with means for locking the same against operation when desired.

These and other features of our invention are illustrated in the accompanying drawings forming a part of this application in which:

Fig. 1 is a plan view of the mower, partly in section;

Fig. 2 is a side elevation, partly in section;

Fig. 3 is an enlarged detail sectional elevation showing the clutch mechanism; and taken on line III—III of Fig. 1;

Fig. 4 is a detail view drawn to a larger scale showing the means for holding the clutch in engagement;

Fig. 5 is a detail perspective view of the cutter bar; and,

Fig. 6 is a detail sectional view taken along line VI—VI of Fig. 3.

Referring now to the drawings for a better understanding of our invention, our improved lawn mower comprises a body formed with a metal cover 10 having a semi-circular forward end 11. A downturned flange 12 extends all around the body. The body is reinforced by means of depending, longitudinally extending plates 13 and 14 and by a transverse reinforcing plate 16. The support for the body is provided at the front by a semi-circular pan 17 which is welded or otherwise suitably secured to a V-shaped member 18 having vertical arms 19 and 21 secured to brackets 22 and 23 on the downturned flange 12. The height of the pan, with respect to the body, may be adjusted as by means of nuts 24 and 26 shown in Fig. 2 on the threaded upper end of the arm 19 it being understood that the arm 21 is similarly provided with adjusting nuts. At the rear, the body is supported by means of a pair of rollers 27 and 28 mounted on a common shaft 29 which is journaled at its ends in depending brackets 31 from the flange 12 at the rear, only one being shown. See Fig. 2. As shown, the two rollers 27 and 28 form, in effect, one continuous roller extending across the rear of the mower between the downturned sides and functioning to roll and smooth the lawn as it is being mowed. Each of the rollers 27 and 28 is provided, near its inner end, with a recessed groove 32 for the reception of a driving belt for propelling the lawn mower over the ground in a manner to be described later. Extending transversely of the body in front of the rollers 27 and 28 is a guard plate 33 to prevent grass from gathering on the rollers. Also, we preferably mount a brush 34 which extends across the mower at the rear of the rollers for cleaning the rollers of any accumulation of dirt and grass. This feature is important especially when mowing lawns when they are wet. The brush 34 may be secured in any suitable manner to the depending flange 12, as by means of the screws 36.

Extending downwardly through the cover 10 directly over the rear of the V-shaped pan support 18 is a shaft 37 which is mounted in a suitable bearing 35, secured to the cover 10. Mounted on the lower end of the shaft 37 is a horizontally disposed cutter bar 38, which is vertically adjustable on the shaft by means of nuts 39 and 41 to vary the height at which grass is being cut. The cutter bar 38 slopes downwardly, as shown in Figs. 2 and 5, from the shaft 37 and has mounted on its outer ends horizontal cutting elements 42 and 43. As will be seen in Fig. 1, the cutting elements do not extend beyond the downturned flange 12, whereby the mower may be brought into close proximity to trees and shrubs without injuring the same. An important feature of our invention is the provision of a breaker bar 44 which is mounted on the shaft 37 directly above the cutter bar 38 and extending at right angles thereto. The breaker bar 44 is provided with upturned ends 46 and 47 which are disposed to strike and throw out any long grass which may be cut by the cutting element 42, thus preventing it from wrapping around the cutter bar shaft 37.

Mounted at the rear of the body, on the cover plate 10 and directly over the roller 27, is a driving motor 48, which is preferably an internal combustion engine. The motor 48 is provided with a driving pulley 49 which drives the cutter bar shaft 37 through a belt 51 and pulley 52 mounted on the upper end of the shaft 37.

Mounted on the cutter bar shaft 37, directly above the bearing 35 is a pulley 53. This pulley 53 drives the rollers 27 and 28 through a belt 54 and a cluster pulley embodying one large pulley 56 and two relatively small pulleys 57 and 58 made fast on the sides of the pulley 56. The V-belts 59 and 61 pass downwardly around the rollers 27 and 28 in the recesses 32. An elongated opening 62 in the top plate 10 provides a way for the passage of the belts 59 and 61 and the clutch mechanism for disengaging the roller drive, which will now be described.

Mounted in the opening 62 is a U-shaped yoke 63. At the forward end of the yoke 63 is a pin 64 which extends forwardly into a threaded sleeve 66 which is screwed into a nut 67 secured to the transverse plate 16 of the body. The end of the pin 64 is provided with a head 68 which bears against a spring 69 which serves to press the yoke rearward. The rear ends of the yoke 63 rest on rollers 60 and 65 carried by the longitudinal reinforcing members 13 and 14. See Fig. 6. Near the rear ends of the yoke 63, each arm is provided with a hooked shaped detent 70 on the upper side. Mounted on the yoke, forwardly of the detent 70, on the two sides of the U-shaped yoke 63, are two rollers 75 and 80 which bear against the forward sides of the V-belts 59 and 61 as shown in Figs. 2 and 3.

The pulleys 57 and 58 of the cluster pulley assembly are provided on their ends with trunnions 72 which are mounted in bearings 73 and 74 provided on L-shaped members 76 and 77 which have their ends bolted together by means of bolts 78 and 79, as shown in Fig. 1 of the drawing. Each of the members 76 and 77 may be provided with a downturned arm 81 which carries a pin 82 fitting into the detents 70 of the U-shaped member 63. The cluster pulley assembly is thus supported on the yoke 63 and the rollers 60 and 65. It will be seen that with the assembly just described, the action of the spring 69 in the threaded sleeve 66, acting against the yoke 63, is to tighten the belts 59 and 61 which drive the rollers 27 and 28. It will also be seen that if the large pulley 56 be moved forwardly it will act to loosen the driving belt 54 and thus stop the movement of the mower over the ground. This result is accomplished in the manner about to be described.

At the rear of the mower is an operator's handle which is composed of two members 86 and 87 joined together at their tops by a cross piece 88, indicated in dotted lines, Fig. 4. The members 86 and 87 are hollow and are mounted in brackets 89 and 91 provided on the rear of the mower. Journaled in the lower ends of the members 86 and 87, below the brackets 89 and 91 is a rod 92, which extends across the mower is close proximity to the downturned flange 12. Carried by the rod 92 are forwardly extending fingers 93 and 94 which bear against the downturned flange 12 at the rear of the mower body. Also carried by the rod 92 and extending rearwardly therefrom beneath the secured ends of the members 76 and 77 is a single finger 96. It will be seen from the foregoing that if the mower handle be moved rearwardly, the rod 92 will be moved forwardly so that the fingers 93 and 94 effect a rotation of the rod 92 in a clockwise direction, as viewed in Fig. 3 of the drawing, thus raising the finger 96 and moving the cluster pulley forward. This loosens the drive belt 54 as previously described and stops the movement of the mower over the ground. The apparatus is so designed that the weight of the handle is sufficient to cause the rocking movement described and the operator has only to turn loose the handle allowing it to drop slightly by its own weight to stop the machine. This is very important in allowing the operator to pick up stones, sticks, or other obstructions off the lawn before running over it and without making any further movement to disengage the drive.

It may sometimes be desirable to secure the drive against disengagement by dropping the handle. This is true when it is necessary to employ the handles as levers for raising the forward end of the mower to get it over obstructions without disconnecting the drive. In order to accomplish the result just mentioned, we mount a pin 101 in the lower end of the member 87 with a sliding fit so that it may be raised and lowered. To the pin 101 we secure a wire, or other elongated flexible member 102 which extends up through the handle member 87 and which terminates in an eye 103 whereby it may be grasped by the operator and pushed downwardly a sufficient distance to engage the downturned flange 12 when the handle is lowered and before the drive is disengaged. Whenever it is desired for the drive to again be disengaged automatically, the pin 101 is retracted. The friction of the flexible member 102 in the handle member 87 is sufficient to prevent the pin 101 from dropping down by its own weight.

In the operation of our improved lawn mower it will be seen that the forward support by the gliding pan 17, directly under the cutter bar 38 provides a means whereby the lawn is cut evenly regardless of the contour of the ground. It will also be seen that the forward upturned portion of the pan aids in pushing loose grass and dirt into depressions on the lawn which loose material is rolled down by action of the rollers 27 and 28. As will also be seen the cutter bar is of a length corresponding to that of the combined length of the rollers 27 and 28, thus providing a combined mowing and rolling of the lawn. Continued use of our improved lawn mower therefore, produces a more even surface. The action of the breaker bar 44 in throwing out long particles of grass cut by the cutter bar 38 places them again in the path of the cutting elements 42 and 43 thus cutting the grass up into short lengths where it is available for filling depressions.

In order to guard against possible injury to the operator by contact with the cutting elements 42 and 43, we preferably provide a plurality of guard elements 106 extending around the sides and in front of the cutter bar 38, which guard elements may be secured to the downturned flange in any suitable manner.

We have found that by mounting the motor 48 on one side over the supporting rollers, damage to the sod forming the lawn is prevented when turning the mower. This uneven transverse weight distribution permits the opposite lightly loaded side to skid over the grass without digging into the same.

While we have shown our invention in but one form, it will be obvious to those skilled in the art that it is not so limited, but is susceptible of various changes and modifications, without departing from the spirit thereof, and we desire, therefore, that only such limitations shall be placed thereupon as are specifically set forth in the appended claims.

What we claim is:

1. In a mower embodying an elongated body having a horizontally disposed rotatable cutter bar mounted on a vertical shaft adjacent the front of the body and a ground engaging driven roller rotatably secured adjacent the rear of the body for supporting the rear end of the same, the combination of a ground engaging sliding support for the front of the body disposed beneath the cutter and secured to the body, and a braker bar mounted above the cutter bar for rotation therewith and in a horizontal plane, said bar being disposed at right angles to said cutter bar and having upturned ends.

2. In a mower embodying an elongated body having a rounded forward end with downturned sides and a ground engaging roller support at the rear of the body together with a cutter mounted at the front of the body for rotation in a horizontal plane and within the vertically projected confines of the body, the combination of a ground engaging sliding support secured to the body and supporting the front end thereof, said support being disposed beneath the cutter bar forwardly of the rotational axis of the cutter bar and across the cutting swath thereof and lying substantially within the vertically projected confines of the body, and a driving motor mounted on the body and operatively connected to drive the cutter bar and roller.

3. A mower as defined in claim 2 in which the roller support extends substantially across the body at the rear and lies within the vertically projected confines of the body, and the cutter is mounted on a vertical shaft secured in fixed angular relation to the rotational axis of the roller support, and in which said motor is operatively connected to said roller at a point intermediate its ends.

4. A mower as defined in claim 2 in which the sliding support comprises a member generally semi-circular as viewed in plan and of a diameter less than the length of said cutter bar, the curved edge of said support being upturned and disposed toward the front of the body, said support member being disposed transversely of the body with its curved edge projecting forwardly of the rotational axis of the cutter bar in position for the ends of the cutter bar to overhang the upturned rounded edge thereof.

5. For use in a mower embodying an elongated body having a rounded forward end with a cutter bar mounted on the body for rotation in a horizontal plane and a ground engaging roller support disposed across the rear end of the body within the vertically projected confines thereof, a ground engaging sliding support disposed beneath the cutter bar transversely of the body and having a forwardly disposed upturned edge and at least a pair of rigid supporting members for the sliding support secured at one end to said sliding support and at the other end to the body.

6. In a mower embodying a rigid body having mounted adjacent the front end thereof a cutter bar rotatable in a horizontal plane, the combination of a ground-engaging elongated roller rotatably secured to the rear of the body and lying within the vertically projected confines of the body, and a ground engaging slidable member disposed beneath the cutter bar wholly in advance of the rotational axis thereof and extending transversely of the body and secured to the body adjacent the front end thereof for supporting the front end of the mower.

LUCIUS N. SMITH.
ALEXANDER SMITH.

REFERENCES CITED

The following references are of record in the file of this patent:

UNITED STATES PATENTS

| Number | Name | Date |
|---|---|---|
| Re. 18,944 | Beasley | Sept. 12, 1933 |
| 2,066,174 | Cregier | Dec. 29, 1936 |
| 2,133,512 | Herge | Oct. 18, 1938 |
| 2,153,771 | Orr | Apr. 11, 1939 |
| 2,200,368 | Iverson | May 14, 1940 |
| 2,232,671 | Loder | Feb. 18, 1941 |
| 2,247,333 | Funk | June 24, 1941 |
| 2,359,358 | Dielschneider | Oct. 3, 1944 |
| 2,390,321 | Packwood | Dec. 4, 1945 |
| 2,403,236 | Phelps | July 2, 1946 |
| 2,478,558 | Beranek et al. | Aug. 9, 1949 |
| 2,549,317 | Laughlin | Apr. 17, 1951 |

FOREIGN PATENTS

| Number | Country | Date |
|---|---|---|
| 107,917 | Australia | July 6, 1939 |